June 4, 1946.  P. E. GELDHOF ET AL  2,401,476
FLUID RESPONSIVE CONTROL MECHANISM FOR AUTOMATIC WASHERS
Original Filed Dec. 2, 1940  3 Sheets-Sheet 1
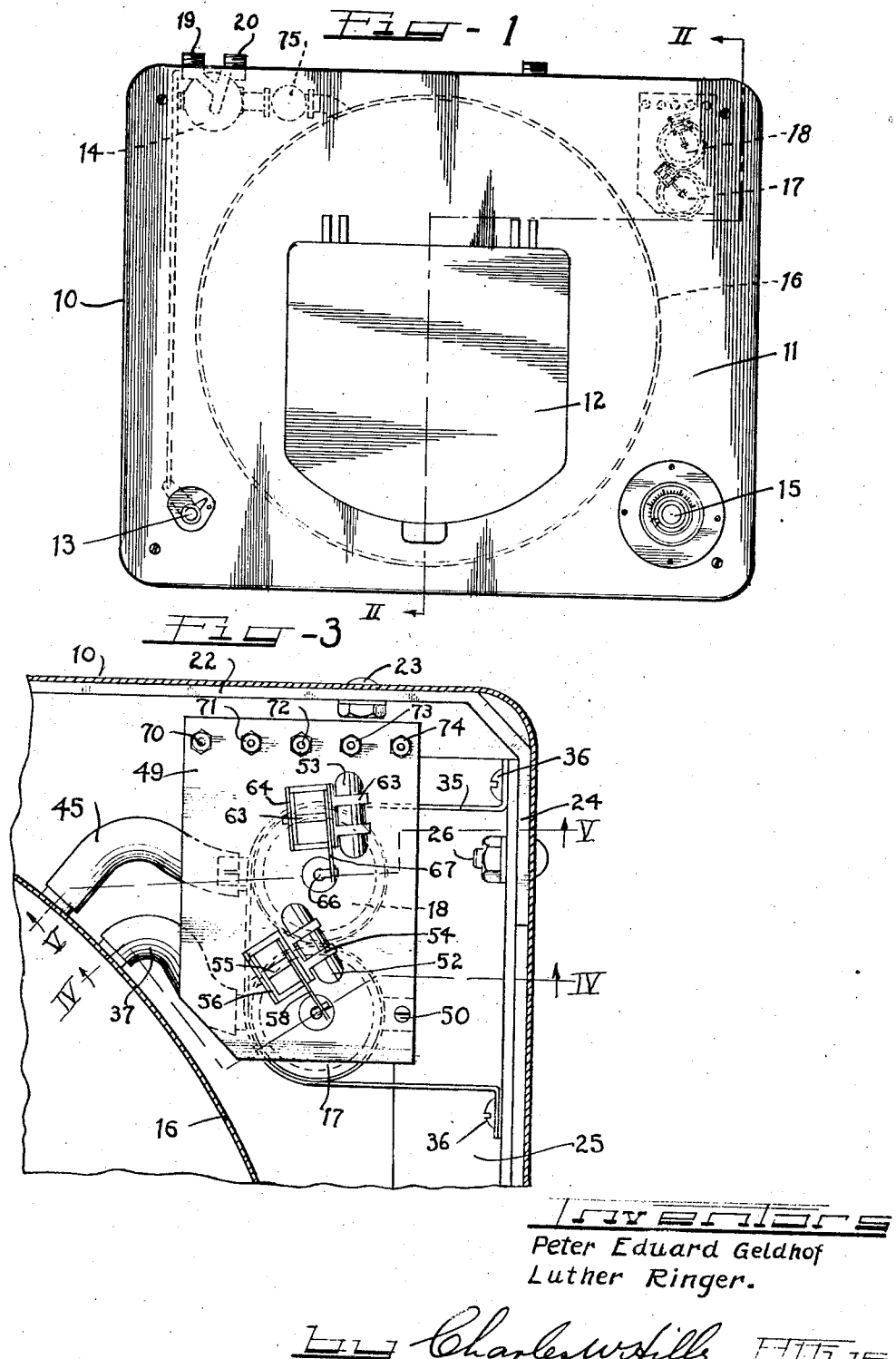
Inventors
Peter Eduard Geldhof
Luther Ringer.
By Charles W. Hills Attys

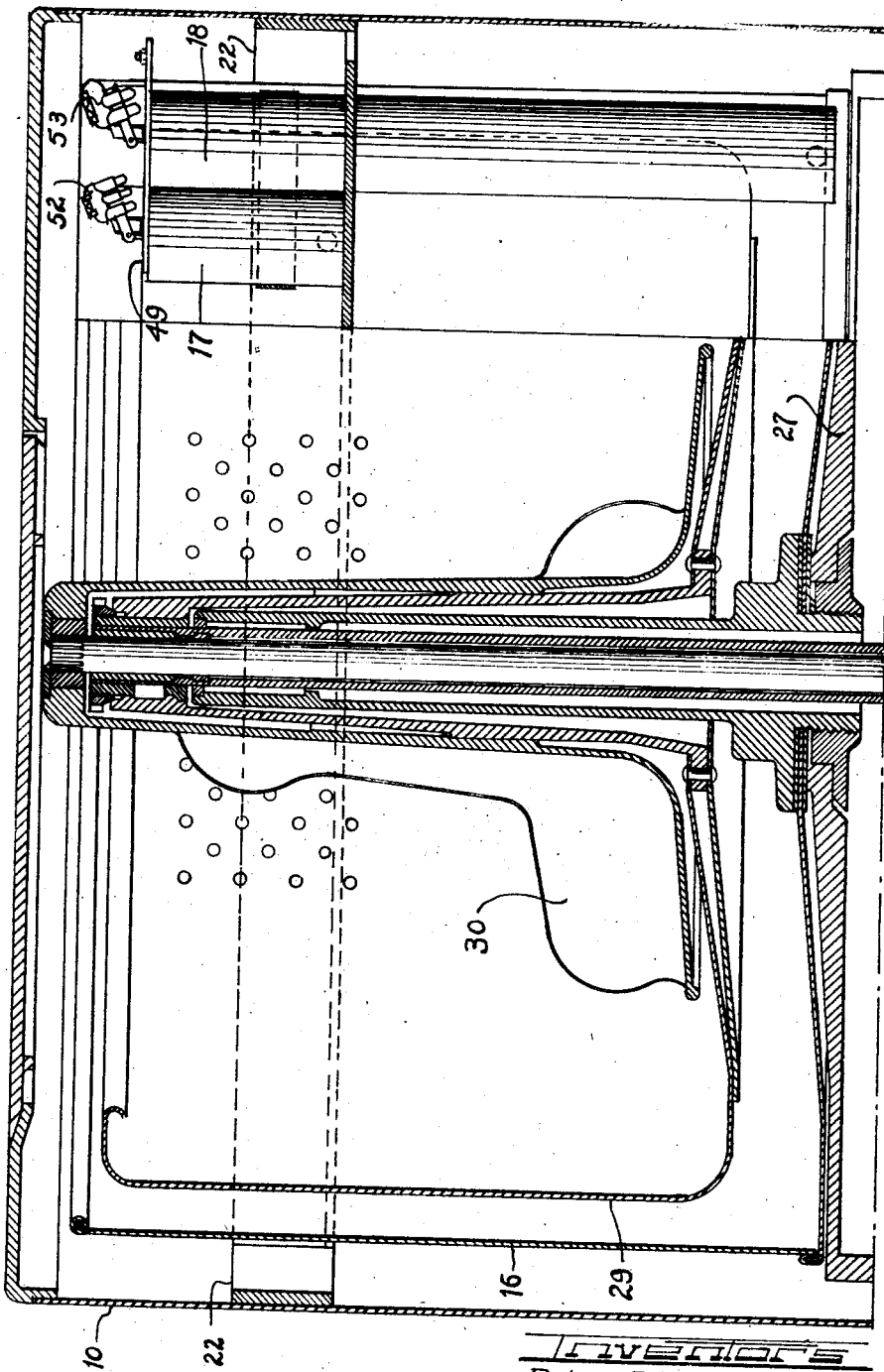

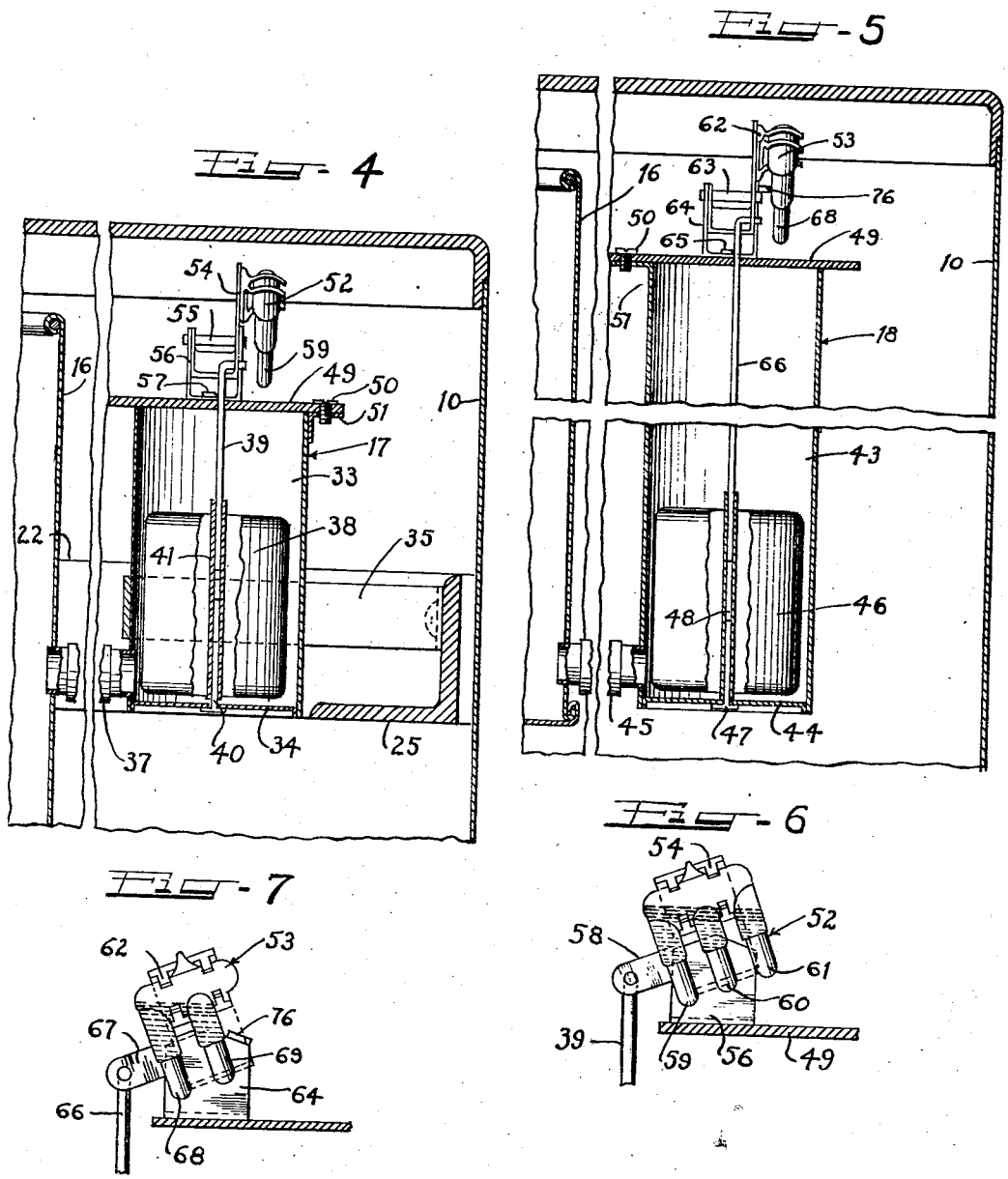

Patented June 4, 1946

2,401,476

UNITED STATES PATENT OFFICE 2,401,476

FLUID RESPONSIVE CONTROL MECHANISM FOR AUTOMATIC WASHERS

Peter Eduard Geldhof and Luther Ringer, St. Joseph, Mich., assignors to Nineteen Hundred Corporation, St. Joseph, Mich., a corporation of New York Original application December 2, 1940, Serial No. 368,190. Divided and this application May 1, 1943, Serial No. 485,292

5 Claims. (Cl. 68—12)

This invention relates to a method of and means for utilizing the level of fluid in a given area to control the supply and removal of fluid to the area as well as certain operations therein which depend upon the nature of the fluid level in the area. More particularly, the invention relates to a fluid responsive control method and means advantageously adapted to use in a washing machine of the domestic or household type which is completely automatic in operation in its washing, rinsing and drying of the clothes or other articles to be washed.

The instant application is a division of application Serial No. 368,190 entitled "Automatic washer," filed December 2, 1940, by Peter Eduard Geldhof and Luther Ringer, now issued as Patent No. 2,347,190, dated April 25, 1944.

It is an object of the present invention to provide a novel method of and means for employing the fluid level in a given area not only to control the supply and removal of the fluid to and from the area but also to control the operations to be performed therein which depend upon the nature of the fluid level in the area for their performance.

It is also an object of the present invention to provide fluid responsive means which serve to control the fluid level in a washing machine, for example, and to utilize the fluid level to effect a control of other operations in a series of washing, rinsing and drying cycles.

Another object of this invention is to provide a new method of controlling the cycles of operation in a so-called automatic washing, rinsing and drying system which is responsive to the height or lack of height of fluid in the washing tub or container.

In accordance with the general features of the present invention there is provided a method of controlling the fluid level in an area and the energizing of certain steps in a cycle of operations to be performed therein comprising the steps of supplying or removing fluid to or from the area, employing the rising or falling of the fluid level to control entry or withdrawal of fluid therefrom and to start or stop those operations performed in the area depending upon the nature of the fluid level in the area for their performance.

It is the aim of this invention to provide a simple control system for such apparatus as automatic washing, rinsing and drying machines which can take advantage of the condition of the fluid level in the washing area as well as the lack of fluid in that area for the purpose of instigating and controlling certain of the operations in the washing, rinsing and drying cycle such, for example, as the pumping of fluid, or the agitating of the fluid and lastly, the actual drying of the clothes in the same area as that in which they are washed after the washing fluid has been withdrawn. Our invention utilizes a very simple float arrangement responsive to the fluid condition in the tub for energizing various electrical circuits connected to the controlling mechanism which operates the different instrumentalities employed to effect the complete cycle of washing, rinsing and drying operations.

In accordance with still other general features of this invention, there is provided a fluid responsive means connected to electrical switches so as to open and close said switches directly as a result of the rise or fall of the fluid in the washing tub; it being understood that the chambers used for the float may be connected by conduits to the interior of the tub or, as a matter of fact, such chambers may be housed in enlargements of the tub, the essential thought being that the fluid which enters the float chamber comes directly from the washing area in the tub.

Moreover, the fluid responsive means of the present invention serves to arrest the operation of any of the washing, rinsing or drying cycles if the fluid level in the washing machine falls or rises, as the case may be, through inadvertent loss or accumulation of the cleansing fluid. For instance, should a quantity of the fluid employed in the washing operation be lost due to splashing, leakage, evaporation or the like while the agitator is oscillating so that the quantity of fluid is less than that required for most effective laundering, the apparatus of the invention functions to arrest the operation of the agitator, to refill the machine to the proper level and to set the agitator in motion again for the remainder of its timed operating cycle.

The novel features which we believe characteristic of our invention are set forth with particularity in the appended claims. Our invention itself, however, both as to its manner of construction and method of operation, together with further objects and advantages thereof, may best be understood by reference to the following description taken in connection with the accompanying drawings, in which:

Figure 1 is a plan view of the washing machine cabinet indicating in dotted lines thereon the location of certain of the parts comprising the apparatus generally;

Figure 2 is a vertical sectional view taken through the upper portion of the machine along line II—II of Figure 1 showing the floating switch mechanism which forms the subject matter of the instant invention;

Figure 3 is a horizontal section through a portion of the machine looking down upon the floating switch mechanism;

Figure 4 is a sectional view of the upper float which regulates the maximum height of water in the machine, as taken along the line IV—IV of Figure 3;

Figure 5 is a sectional view of the lower float which indicates when the machine is empty, as taken along the line V—V of Figure 3;

Figure 6 is an elevation of the mercury switch on the upper float; and

Figure 7 is an elevation of the mercury switch on the lower float.

The automatic washing machine which is shown generally in Figures 1 and 2 and is described in greater detail in the above mentioned parent application, Serial No. 368,190 includes a casing 10 which houses the entire mechanism and control therefor. The casing 10 is closed by a cover plate 11 having a pivotally mounted lid or panel 12 mounted therein through which the clothes and other articles to be washed may be placed in the machine. In the lower left-hand corner of cover plate 11, as seen in the plan view of Figure 1, is a control knob 13 which regulates the automatic temperature control mixing valve 14 shown in dotted outline at the upper left-hand corner of the same figure. In the lower right-hand corner of the cover plate 11 in Figure 1 is the main control knob 15 of the automatic timer. In order to fix the relative location of the parts of the apparatus, the top of the tub 16 has been dotted in and units 17 and 18 of the floating switch mechanism of the present invention, also in dotted outline, have been shown in Figure 1. Connections 19 and 20 are for supplying the necessary hot and cold water at city main pressure to mixing valve 14.

As may best be seen in Figures 2 and 3 of the drawings, a bar 22 is secured to opposite side walls of casing 10 as by means of bolts 23. Bar 22 is advantageously of such length as to extend completely across the side of the casing 10 on which they are mounted and across the adjacent corners thereof in end portions 24. Bar 22 together with angle irons such, for example, as member 25 secured to casing 10 by bolts 26 which pass through said casing and the end portion 24 of bar 22 serve to support a floating base member or spider 27 which is suspended therefrom by suitable resilient mounting brackets (not shown) which may advantageously take the form of those shown and described in our above-mentioned copending application, Serial No. 368,190.

Substantially all of the principal operating and control mechanisms of the washing machine is mounted on and carried by the spider 27. Referring to Figure 2 of the drawings, it will be observed that a wash tub 16 is supported by the spider 27. Rotatably mounted in tub 16 is a perforated drying basket 29 within which is disposed an agitator 30 which is adapted to be oscillated during the washing operation. Suspended from the under side of the spider 27 is a motor, a pump, suitable transmission means, as well as clutch and control mechanisms (not shown) all of which serve to operate the several parts of the apparatus but form no part of the instant invention.

The floating switch mechanism which represents one embodiment of the present invention is best shown in Figures 2 to 7, inclusive, of the drawings. Unit 17 of the floating switch mechanism is employed to indicate and electrically control the maximum amount of water contained in the tub 16. Unit 18 is employed to indicate when tub 16 is empty.

Unit 17 of the floating switch mechanism includes a tube 33 which is closed at its lower end by an end plate 34. This tube 33 is mounted and held in place by a strap 35 which is bolted or otherwise suitably secured to angle iron 25 or any other portion of the casing 10 as by bolts 36. The lower end of tube 33 is in open communication with tub 16 through a flexible hose 37 which is connected to said tub 16 just below the desired maximum water level in the tub. Disposed within the tube 33 is a float 38 which is carried on a rod 39 which projects out of the tube 33. A guide pin 40 projects up from the end plate 34 into a tubular inner shell 41 of float 38. The inner shell 41 makes a fluid tight connection at both ends with the body of float 38 in a manner well understood by those skilled in the art.

Unit 18 of the floating switch mechanism is generally similar to the unit 17 in that it comprises a tube 43 which is closed at its lower end by an end plate 44. The tube 43 is much longer than the tube 33 of unit 17 since it extends down to the base of the tub 16. The tube 43 is in open communication with tub 16 through a flexible hose 45 located at the bottom of said tub. It will thus be understood that any water in the tub 16 will pass into the tube 43 and remain at the same level there as in tub 16. A float 46 is mounted in tube 43, a guide pin 47 being provided to retain it in its proper position. The guide pin 47 projects up from end plate 44 and extends into a tubular inner shell 48 in the float 46.

A plate 49 of insulating material, such as fibreboard or the like, is bolted above the tubes 33 and 43 as by means of bolts 50 which are threaded into angle clips 51. Clips 51 are shown as being welded or soldered to the side walls of the tubes 33 and 43.

Mercury switches 52 and 53 are operatively associated with tubes 33 and 43 of units 17 and 18, respectively, of the floating switch mechanism. The mercury switch 52 is mounted in a cradle 54 which is pivotally mounted on a pin 55 carried in a U-shaped support 56 which is secured to plate 49 by means of bolts 57 or other suitable fastening. The cradle 54 has an integral arm 58 formed thereon into which the float rod 39 of float 38 is hooked.

As may be seen in Figure 6, the mercury switch 52 advantageously takes the form of a glass tube having three depending tubular portions for receiving female socket members or end caps 59, 60 and 61 carrying the lead wires for conductors connected to the switch. It will, of course, be understood that the metal caps 59, 60 and 61 are electrically connected with the interior of the depending glass tubular portion so as to be at all times in contact with the mercury contained therein.

Mercury switch 53 is supported in a cradle 62 which is pivotally mounted on a pin 63 carried in a U-shaped support 64 which is bolted to the plate 49 by means of bolts 65. Float rod 66 which is secured to float 46 and projects out of tube 43 is hooked into arm 67 forming part of the cradle 62 of the mercury switch 53.

The mercury switch 53 which takes the form shown in Figure 7 is generally similar to the mercury switch 52 with the exception that only two depending tubular portions terminating in metals caps 68 and 69 are provided.

The plate 49 also serves as a terminal block for the two mercury switches 52 and 53, terminal posts 70, 71, 72, 73 and 74 being provided therefor. The terminal posts 70, 71, and 72 are electrically connected through flexible pig-tail conductors (not shown) to the metal end caps 59, 60 and 61. The terminals posts 73 and 74 are similarly connected to metal end caps 68 and 69 of the mercury switch 53.

The operation of the floating switch mechanism will best be understood by outlining certain of the steps which take place in the normal operation of the automatic washer. After the clothes or other fabric materials together with appropriate detergents have been placed in the basket 29, the operator adjusts control valve 13 which sets mixing valve 14 for the desired water temperature and main control knob 15 to set the control circuit thereof in operation. Flow control valve 75 (shown generally in dotted outline in Figure 1 of the drawings) connected through mixing valve 14 to water connections 19 and 20 supplies water to the tub 16. As the tub 16 fills, the water rises to a corresponding level in tubes 33 and 43 of units 17 and 18, respectively, of the floating switch mechanism by virtue of their direct communication with tub 16 through flexible hoses 37 and 45, respectively.

The several conducting caps 59, 60 and 61 of mercury switch 52 are intended to be connected into an electrical circuit by means of their connection with terminal posts 70, 71 and 72 which are, in turn, connected to suitable electrical conductors. The tilting of mercury switch 52 serves to make and break the electrical circuit thereby controlling certain operations involved in the complete cycle for which the automatic washing machine is designed. Mercury switch 53 is likewise connected into the electrical control circuit by means of the interconnection of caps 68 and 69 with terminals 73 and 74 to perform certain requisite steps in the operation of the machine.

When the operator sets control knob 15, water enters tub 16 from flow control valve 75. Float 38 of unit 17 and float 46 of unit 18, at the beginning of operations, will be in the position shown in Figures 4 and 5, respectively, and as a result the mercury switches 52 and 53 thereof will be tilted in the position substantially as illustrated in Figures 6 and 7, respectively. It will be seen that the mercury in the switch 52 bridges the left hand cap 59 and center cap 60. In the same way, caps 68 and 69 of switch 53 will be interconnected when the switch is in the position shown on Figure 7.

When the water rises in tub 16, it also rises in tube 43 of unit 18 interconnected therewith by means of flexible hose 45 and causes the float 46 to be raised therein. As the float 46 raises, the float rod 66 moves upward tilting cradle 62 which is pivotally mounted in U-shaped support 64 thereby shifting the mercury switch 53 so that the connecting caps 68 and 69 formerly in inclined relation to the vertical axis of float rod 66 (as seen in Figure 7) will approach a vertical position. The mercury switch 53 will be retained in this position by contact with a stop 76 which extends outwardly from the U-shaped support 64. The switch 53 will, of course, remain with caps 68 and 69 thereof in this vertical position as long as tube 43 is filled with water. As will be readily understood, the mercury which formerly bridged the caps 68 and 69 will thereafter separate in the glass thus breaking the electrical circuit into which they are connected.

By virtue of the fact that the interconnection between tub 16 and tube 33 comprising the flexible hose 37 is located adjacent the top of tub 16, unit 17 of the floating switch mechanism will not come into operation until the water in tub 16 rises to the point of this connection. Unit 17, therefore, establishes the maximum level of the water in the tub 16 throughout the operation of the machine.

The operation of float 38 and its associated apparatus forming part of the unit 17 is substantially similar to that already described with respect to unit 18. The mercury switch 52 however differs from mercury switch 53 in that it is provided, as we have seen, with three contacting caps 59, 60 and 61 instead of two such caps as in the case of switch 53. As the water rises in tube 33 float 38 is raised and the float rod 39 secured thereto tilts cradle 54 carrying mercury switch 52 from the inclined position shown in Figure 6 to a substantially vertical position in which the mercury in the tube separates thus breaking the contact between caps 59 and 60.

As the float 38 continues its upward motion cradle 54 and mercury switch 52 continue to pivot about pin 55 under the influence of float 38 and rod 39 until they reach a position directly opposite to the inclined position shown in Figure 6 of the drawings. The mercury in switch 52 now bridges contact caps 60 and 61. In this operation, the portion of the electrical circuit into which caps 59 and 60 are connected is broken and that portion of the circuit into which caps 60 and 61 are connected is closed.

It will be readily appreciated that when the water is drained from the tub 16 and tubes 33 and 43 in the ordinary operation of the machine, the exact reverse of the operations just described will take place in each case. When tub 16 is completely drained, the several parts of the apparatus will assume the same positions as those shown in Figures 4 to 7, inclusive, which represent the relationship of the structural elements at the beginning of operations.

The apparatus of the present invention is adapted to use in the making and breaking of any electrical circuits by means of which a series of mechanical steps which are dependent upon the rising and falling of the level of a liquid medium for their accomplishment may be controlled.

By way of illustration, connecting caps 59 and 60 of switch 52 may serve by suitable electrical connections to open and close the circuit controlling the operation of the flow control valve 75. Valve 75 may thus be opened, for instance, when caps 59 and 60 are bridged by the mercury in switch 52 and then closed to cut off the supply of water to tub 16 when it has reached the desired level and caused float 38 in unit 17 to tilt the switch 52 vertically so as to break the circuit. Connecting caps 60 and 61 of switch 52 may be wired in such a way as to close an electrical circuit setting the agitator 30 into operation when the tub 16 has been filled with water and the switch 52 is tilted in a position at the opposite extreme to that shown in Figure 6.

In the same way, caps 68 and 69 of switch 53 may be arranged to start the drying basket 29 when the unit 18 incorporating switch 52 indicates that the tub 16 has been completely drained of water.

The electrical circuits into which the floating switch mechanism of the instant invention is connected have not been shown or described in detail herein for the reason that they form no part of the present invention.

While we have shown and described particular embodiments of our invention it will, of course, be understood that we do not wish to be limited thereto, since many modifications may be made, and we, therefore, contemplate by the appended claims to cover all such modifications as fall within the true spirit and scope of our invention.

We claim as our invention:

1. In an automatic washing machine of the type adapted to perform washing, rinsing and drying operations and including a tub in which is disposed a spinner and an agitator concentrically arranged as well as means for delivering to and withdrawing therefrom fluid used in the washing operation, control means responsive to two different levels of the fluid in the tub for energizing electrical circuits controlling the operation of the agitator, the pumping of fluid to the tub and the actuation of the spinner in proper sequence and in accordance with the condition of the fluid contents of the tub, said control means including a first float means positioned to be responsive to the level of the fluid in the tub and connected to switch means in said electrical circuit for controlling the energization thereof operable by said first float means, said first float means being so arranged that when the fluid reaches a level in the tub as determined by the elevational portion of said first float, the state of energization of said electrical circuit is changed so that the pumping of said fluid is arrested and the agitating action is commenced and also including a second float means so positioned that when the fluid had been withdrawn from the tub the operation of the spinner is commenced.

2. Fluid responsive means for controlling the level of fluid in a vessel and other operations associated therewith comprising a plurality of fluid reservoirs associated with said vessel and disposed at points intermediate the ends of said vessel corresponding generally with the fluid levels desired to be maintained within said vessel, means for communicating said vessel with said reservoirs, each of said communicating means opening into said vessel at a different height, and means associated with each of said reservoirs for controlling the supply and removal of fluid to and from said vessel as well as other associated operations.

3. Fluid responsive means for controlling the level of fluid in a vessel and other operations associated therewith comprising a plurality of fluid reservoirs of different vertical lengths associated with said vessel and disposed exteriorly thereof at points intermediate the ends of said vessel corresponding generally with the fluid levels desired to be maintained within said vessel, means for communicating different fluid levels in said vessel with said reservoirs respectively, and means associated with each of said reservoirs for controlling the supply and removal of fluid to and from said vessel as well as other associated operations.

4. Fluid responsive means for controlling the level of fluid in a vessel and other operations associated therewith comprising a pair of fluid reservoirs associated with said vessel and disposed at points intermediate of the top and bottom of said vessel corresponding generally with the fluid levels desired to be maintained within said vessel, means connecting one of said reservoirs to said vessel in proximity to the top of the vessel and the other reservoir to said vessel in proximity to the bottom thereof and said reservoirs, float means in each of said reservoirs actuated by the rise and fall of fluid in said vessel and means associated with each of said reservoirs for controlling the supply and removal of fluid to and from said vessel as well as other associated operations.

5. Fluid responsive means for controlling the level of fluid in a vessel and other operations associated therewith comprising a short tubular reservoir and a tall tubular reservoir associated with said vessel and disposed exteriorly thereof at points intermediate of the top and bottom of said vessel corresponding generally with the fluid levels desired to be maintained within said vessel, said short tubular reservoir being disposed in proximity to the top of said vessel and said tall tubular reservoir extending substantially between the top and the bottom of said vessel, means connecting said short reservoir to said vessel in proximity to its top and said tall reservoir in proximity to its bottom, float means in each of said reservoirs actuated by the rise and fall of fluid in said vessel, switch means for controlling the supply and removal of fluid to and from said vessel as well as other associated operations, and means for connecting said float means and said switch means.

PETER EDUARD GELDHOF.
LUTHER RINGER.